Patented May 18, 1937

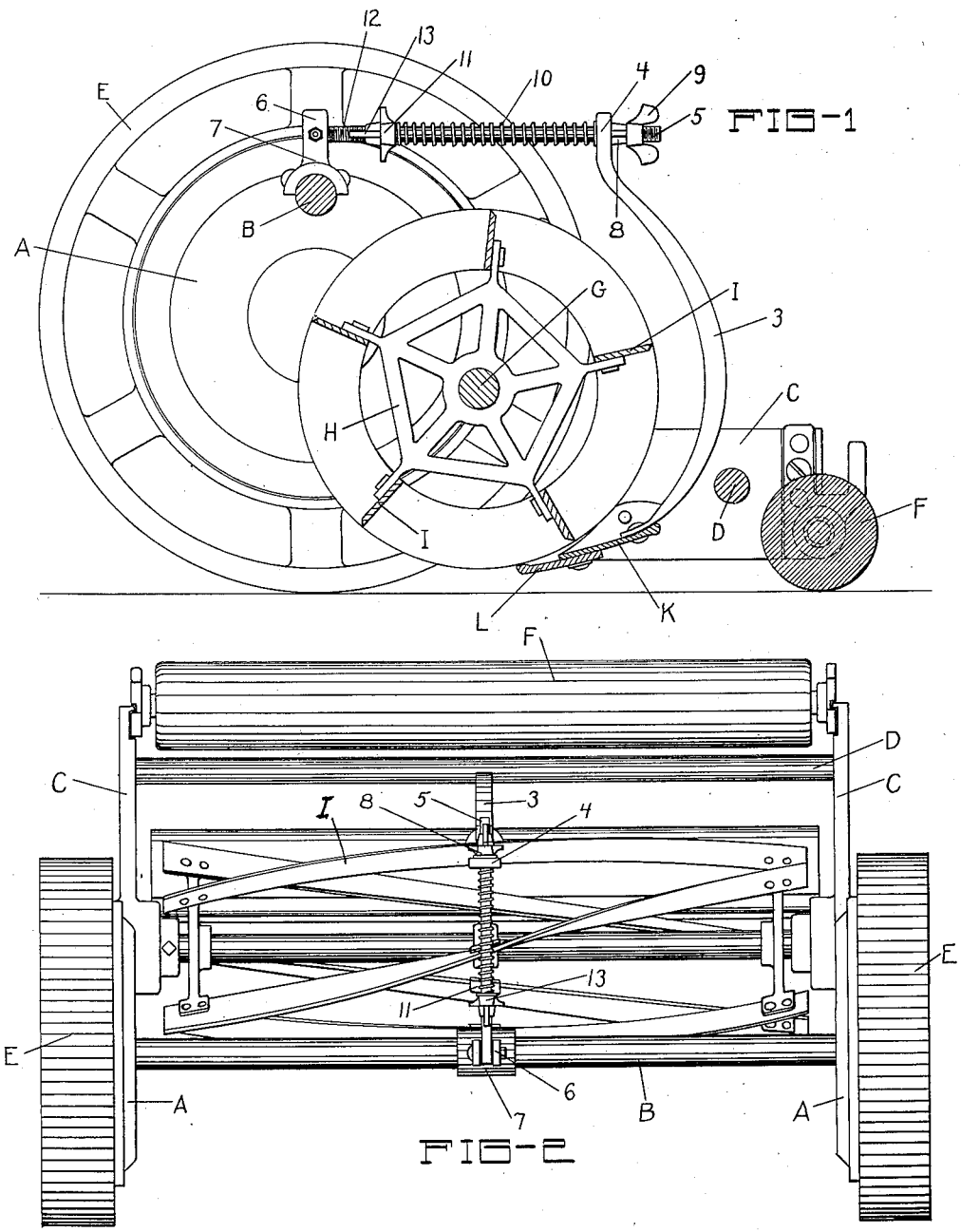

2,080,648

UNITED STATES PATENT OFFICE 2,080,648

LAWN MOWER ATTACHMENT

Lloyd C. Ainsworth, Moline, Ill.

Application December 12, 1935, Serial No. 54,073

2 Claims. (Cl. 56—294)

My invention has reference to a lawn mower attachment, the chief purpose thereof being to increase the efficiency and facility of operation of such machines. It is designed for application to a common type of such machines, wherein the grass is cut by the action of a series of rotary knives passing over the blade of a cutter bar, and in which the operation is generally satisfactory, except when the machine encounters an obstacle, such as a small stone, stick, or the like. On account of the momentum of the machine, with the added force applied thereto by the operator, the result is usually a sudden stoppage of the mower, and impairment of some of the parts thereof. This sometimes consists in a twist in the frame carrying the knives, or in other fault causing a mis-alignment of the knives, so that the operation is ineffective and unsatisfactory. Sometimes the unusual strain causes a defect in the cutter-blade.

By means of the attachment set forth herein a yieldable support is provided for the cutter-bar, permitting a limited amount of separation between the blade carried thereby and the knives. Associated with the means just mentioned is a means for giving a quick and positive adjustment to the cutter-blade, to or from the knives. In machines of the type named it is a well-known construction to support the cutter-bar rockingly at its ends, and hold the same rigidly in position by set-screws directed against the bar from above and below, at both of its ends. With this construction the adjustment of the cutter-bar and blade is a somewhat arduous one, and difficult of successful accomplishment. By the use of the present invention these objectionable features are obviated.

The above named, and other features and advantages of the invention will more fully appear from the following specification, reference being had to the accompanying drawing, in which;

Fig. 1 is a cross-section of a machine equipped with the attachment, on the broken line 1—1 of Fig. 2.

Fig. 2 is a plan view of the machine.

The frame of the machine is formed with end plates A, united by a tie-rod B, and having rearward extensions C, united by another rod D. The frame plates are carried by wheels E, and the extension is supported in the usual manner by a roller F. Mounted for rotation in the end-plates A is a shaft G, to which is fixed a frame H, to which are secured the cutter-knives I, in the customary spiral arrangement. Movement is imparted to the shaft G to give rotation thereto by means of gearing of a well known type contained in the end frames, and not shown in the drawing herein.

A bar K is pivoted at its ends in the extensions C of the frame, to the lower side of which bar is attached a cutter-blade L, with a projecting edge adapted to be held in cooperative relation with the knives on the reel, for use in the mowing operation. The structure hereinbefore described shows a conventional type of machine, without the usual adjustment features for the cutter-bar, and which is available for the addition of the features which are considered to be novel in the machine. These features are as follows;—

Fixed at its lower end to the cutter-bar K is a curved arm 3, having a head 4 perforated for the passage of a rod 5, the other end of which is pivoted in a forked extension 6 of a bracket 7 fixed to the tie-rod B by means of bolts or screws passing through the bracket into said tie-rod. The rearward movement of the arm 3 is limited by means of a thumb-nut 8 on the threaded end 9 of said rod, with an additional lock-nut thereon, and said arm is capable of a yieldable forward movement by means of a coiled spring 10 on the rod 5 and a wing-nut 11 on the threaded portion 12 of said rod. A lock-nut 13 is also provided on said threaded portion, to hold the nut 11 in adjusted positions. The tension of the spring 10 is such as to permit a considerable rocking movement of the arm 3 in case the blade L encounters an obstacle, with a shock-absorbing effect, tending to prevent any injury to the machine thereby. Upon removal of the obstacle the blade is returned to its normal cutting position by the spring. By turning the nut 11 the tension of said spring can be increased or lessened, as desired, and by a slight change in the position of the nut 8 the cutter-bar can be rocked to properly position the blade L with reference to the knives of the reel.

The attachment is preferably positioned at a central point midway the wheels, as shown, and with a cutter-bar of sufficient rigidity the cutter-blade will be held in cooperative relation with the knives throughout the length thereof.

The invention is of simple construction, and can be incorporated with a lawn mower of the type set forth herein at a minimum of additional cost.

What I claim, and desire to secure by Letters Patent, is:

1. An attachment for a lawn mower of that type which embodies a pair of supporting frames and tie-rod uniting the same, a pair of drive-wheels at the ends of said tie-rod, a cutter-blade reel, and a rockingly mounted cutting-blade coacting with said reel,—comprising a rearwardly bent arm attached at its lower end to the rear edge of said cutting blade, a bracket on said tie-rod, a rod connection between said mounting and the free end of said arm, having a slidable relation with said arm, an abutment on said rod adjacent to said mounting, a coiled spring on said rod connection, between said abutment and said arm, and means on said rod connection for adjustment of the position of said arm.

2. An attachment for a lawn mower of that type which embodies a pair of supporting frames and tie-rod uniting the same, a pair of drive-wheels at the ends of said tie-rod, a cutter-blade reel, and a rockingly mounted cutting blade coacting with said reel,—comprising a rearwardly bent arm secured to the rear edge of said cutting blade, a bracket on said tie-rod, a rod connection between said arm and bracket, having a slidable relation with said arm, and provided at opposite ends with screw-threads, a nut on the arm end of said rod connection adapted to hold said arm in adjusted positions, a nut on the opposite end of said rod connection forming an abutment thereon, and a spring between said last-named nut and said arm, holding said arm yieldably in place, said last-named nut being capable of adjustment to increase or decrease the tension of said spring.

LLOYD C. AINSWORTH.